US011983004B2

(12) United States Patent
Oyama

(10) Patent No.: US 11,983,004 B2
(45) Date of Patent: May 14, 2024

(54) VEHICLE CONTROL DEVICE

(71) Applicant: TOYOTA JIDOSHA KABUSHIKI KAISHA, Toyota (JP)

(72) Inventor: Keisuke Oyama, Nisshin (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 323 days.

(21) Appl. No.: 17/468,833

(22) Filed: Sep. 8, 2021

(65) Prior Publication Data
US 2022/0083050 A1 Mar. 17, 2022

(30) Foreign Application Priority Data

Sep. 15, 2020 (JP) ................. 2020-154277

(51) Int. Cl.
*G05D 1/00* (2006.01)
*B60R 25/24* (2013.01)
*H04W 4/40* (2018.01)

(52) U.S. Cl.
CPC ......... *G05D 1/0016* (2013.01); *B60R 25/245* (2013.01); *G05D 1/0022* (2013.01); *H04W 4/40* (2018.02); *B60R 2325/202* (2013.01); *B60R 2325/205* (2013.01)

(58) Field of Classification Search
CPC ........ B60R 2325/202; B60R 2325/205; B60R 25/245; G05D 1/0016; G05D 1/0022; G05D 2201/0213; H04W 4/024; H04W 4/40

See application file for complete search history.

(56) References Cited

U.S. PATENT DOCUMENTS

| 10,040,482 | B1* | 8/2018 | Jung | .................... G05D 1/0011 |
| 2013/0311004 | A1 | 11/2013 | Okamura et al. | |
| 2016/0121907 | A1* | 5/2016 | Otake | ............... B60W 60/0057 701/23 |
| 2016/0148450 | A1* | 5/2016 | Ohshima | ............... H04W 12/06 340/5.61 |
| 2019/0248331 | A1* | 8/2019 | Salah | .................... G01S 5/0284 |
| 2019/0382248 | A1* | 12/2019 | Norstad | ................... B66D 1/00 |

(Continued)

FOREIGN PATENT DOCUMENTS

| CN | 110023148 A | 7/2019 | |
| CN | 110100448 A | 8/2019 | |
| EP | 4029749 A1 * | 7/2022 | ........... B60R 25/245 |

(Continued)

*Primary Examiner* — Babar Sarwar
(74) *Attorney, Agent, or Firm* — Sughrue Mion, PLLC

(57) ABSTRACT

A vehicle control device comprises a drive device configured to enable application of a driving force to a vehicle in an actuation state. The vehicle control device executes remote operation control of controlling the drive device in accordance with a wireless signal transmitted from a portable terminal present outside the vehicle, to thereby cause the vehicle to move to a predetermined target stop position. The vehicle control device maintains the drive device in the actuation state after an arrival time being a time at which the vehicle arrives at the target stop position, and invalidates the operation on the accelerator even when the accelerator is operated in a period from the arrival time to a cancellation condition satisfaction time at which a cancellation condition by which a fact that a user holding legitimate qualification has gotten in the vehicle can be confirmed is satisfied.

2 Claims, 12 Drawing Sheets

(56) References Cited

U.S. PATENT DOCUMENTS

2020/0041992 A1* 2/2020 Nagashima ......... G06F 3/04847
2020/0090437 A1   3/2020 Ichinose et al.

FOREIGN PATENT DOCUMENTS

| JP | 2008-015839 A | 1/2008 | |
|----|---------------|--------|---|
| JP | 2017-114235 A | 6/2017 | |
| WO | 2012/104964 A1 | 8/2012 | |
| WO | WO-2012104964 A1 * | 8/2012 | ................ B60T 7/12 |

* cited by examiner

VEHICLE CONTROL DEVICE

TECHNICAL FIELD

The present disclosure relates to a vehicle control device capable of executing emote operation control of causing a vehicle to travel to a target stop position and then stop the vehicle through operation on a portable terminal by a user present outside the vehicle.

BACKGROUND

Hitherto, there has been known a vehicle control device capable of executing the above-mentioned remote operation control After a vehicle arrives at a target stop position, a user who has been operating a portable terminal outside the vehicle gets in the vehicle, and starts a vehicle-inside driving operation through use of an accelerator pedal, a steering wheel, and the like.

For example, a vehicle control device (hereinafter referred to as "related-art device") described in international Patent WO 2012/104964 A1 is configured to give priority to the driving of the vehicle through the vehicle-inside driving operation over the driving of the vehicle through the operation on the portable terminal after the arrival of the vehicle at the target stop position.

SUMMARY

The related-art device starts the remote operation control when there is satisfied a movement condition including a condition that fingerprint verification for the operator of the portable terminal is successful. However, the related-art device does not determine whether or not the person who gets in the vehicle after the arrival of the vehicle at the target stop position is a person holding legitimate qualification for driving the vehicle. Thus, the vehicle on which the related-art device is mounted allows a person who intends to steal the vehicle after the arrival of the vehicle at the target stop position to get in the vehicle and execute the vehicle-inside driving operation, and there is a fear in that the vehicle is to be stolen.

The present disclosure has been made in view of the above-mentioned problem. That is, one object of the present disclosure is to provide a vehicle control device capable of reducing such a risk that a vehicle is to be stolen after arrival of the vehicle at a target stop region through remote operation control.

A vehicle control device (hereinafter referred to as "device of the present disclosure"), according to at least one embodiment of the present disclosure includes: a drive device (42a) configured to enable application of a driving force to a vehicle in an actuation state and disable application of the driving force to the vehicle in a non-actuation state; and a control unit configured to control the drive device in such a manner as to change the driving force based on an operation on an accelerator by a user when the drive device is in the actuation state (Step 1105, Step 1115, Step 1120), communicate with a portable terminal present outside the vehicle, and to execute remote operation control (Step 325, Step 900 to Step 995) of controlling the drive device in accordance with a wireless signal transmitted from the portable terminal present outside the vehicle based on an operation on the portable terminal by the user to apply the driving force to the vehicle, to thereby cause the vehicle to move to a predetermined target stop position determined in advance.

The control unit is configured to:

maintain the drive device in the actuation state without changing the drive device to the non-actuation state after an arrival time being a time at which the vehicle arrives at the target stop position through the remote operation control (Step 334, Step 336, Step 1045, Step 1125); and invalidate the operation on the accelerator such that the driving device disables application of the driving force to the vehicle (Step 336, Step 344, Step 1045, Step 1125) even when the accelerator is operated in a period from the arrival time to a cancellation condition satisfaction time at which a cancellation condition by which a fact that a user holding legitimate qualification for using the accelerator to drive the vehicle has gotten in the vehicle can be confirmed without requiring an operation by the user is satisfied (Step 342, "No" in Step 515).

With the device according to the present disclosure, after the arrival time, the drive source is maintained in the actuation state, and the operation on the accelerator is invalidated. The invalidation of the operation on the accelerator is cancelled when the cancellation condition by which the fact that the user holding legitimate qualification for using the accelerator to drive the vehicle has gotten in the vehicle can be confirmed without requiring the operation by the user is satisfied. Thus, even when a person who intends to steal the vehicle after arrival of the vehicle at the target stop position gets in the vehicle, the cancellation condition is not satisfied, and hence the operation on the accelerator by this person is invalidated. As a result, a risk of vehicle theft after arrival of the vehicle at the target stop position can be reduced. Further, the actuation state of the power source is maintained after the arrival time, and when a user holding the legitimate qualification gets in the vehicle, the invalidation of the operation on the accelerator is cancelled. Thus, the user holding the legitimate qualification can start the vehicle without startup operation.

In one aspect of the device of the present disclosure, the control unit is configured to determine that the cancellation condition is satisfied when an electronic key configured to transmit, through a wireless signal, an identifier set in advance is present inside the vehicle, and the identifier transmitted by the electronic key matches an identifier stored in advance (Step 340, Step 342, Step 344, "Yes" in Step 510, "No" in Step 515, Step 540).

According to this aspect, when the identifier transmitted by the electronic key present inside the vehicle matches the vehicle unique identifier, it is confirmed that a user holding the legitimate qualification has gotten in the vehicle, and it is determined that the cancellation condition is satisfied. As a result, the user who has gotten in the vehicle and is carrying the electronic key can satisfy the cancellation condition without executing a special operation, and can thus cancel the invalidation of the operation on the accelerator.

In one aspect of the device of the present disclosure, the control unit is configured to:

change the drive device to the actuation state (Step 316, Step 615) when a predetermined startup operation is executed on the portable terminal present outside the vehicle, and the control unit receives a startup signal transmitted by the portable terminal (Step 314, "Yes" in Step 605); and start the remote operation control (Step 326, Step 815) when a predetermined start operation is executed after the startup operation is executed on the portable terminal present outside the vehicle, and the control unit receives a start signal transmitted by the portable terminal (Step 324, "Yes" in Step 810).

According to the above-mentioned aspect, when the user executes the startup operation on the portable terminal, the user can cause the drive source to transition to the actuation state. When the user executes the start operation on the portable terminal, the user can start the remote operation control. Thus, the user can cause the drive source to transition to the actuation state and start the remote operation control by operating the portable terminal while being present outside the vehicle without getting in the vehicle. Even under a state in which there is no space for opening a door for a driver's seat of the vehicle, and the user cannot thus get in the vehicle, the user can start the remote operation control while being present outside the vehicle. Then, the user can stop the vehicle at the target stop position through the remote operation control and can get in the vehicle that has stopped at the target stop position.

In one aspect of the device of the present disclosure, the device of the present disclosure comprises a communication unit (25) configured to enable communication with the portable terminal in an activated state and disable communication with the portable terminal in an inactivated state.

The control unit is configured to activate the communication unit, to thereby change the state of the communication unit to the activated state (Step 308, Step 310, Step 525) when an electronic key configured to transmit, through a wireless signal, an identifier set in advance is present outside the vehicle, and the identifier transmitted by the electronic key matches an identifier stored in advance (Step 302 to Step 306, "Yes" in Step 510, "Yes" in Step 515).

According to this aspect, when the identifier transmitted by the electronic key present outside the vehicle matches the vehicle unique identifier, it is confirmed that a user holding the legitimate qualification is present outside the vehicle in a range of a predetermined distance from the vehicle, and it is then determined that the activation condition is satisfied. As a result, it is not required to always maintain the communication unit in the activated state. Thus, power consumption of the communication unit can be reduced, and it is possible to activate the communication unit when a possibility of requiring the communication connection with the portable terminal becomes high.

In the above description, for easier understanding of the present disclosure, the terms and/or reference symbols used in at least one embodiment described below are enclosed in parentheses and assigned to the components of the present disclosure corresponding to the at least one embodiment. However, the constituent elements of the present disclosure are not limited to the at least one embodiment defined by the terms and/or reference symbols. Other objects, other features, and accompanying advantages of the present disclosure are easily understandable from the description of the at least one embodiment of the present disclosure to be given with reference to the following drawings.

DETAILED DESCRIPTION

<Configuration>

Figure 1:
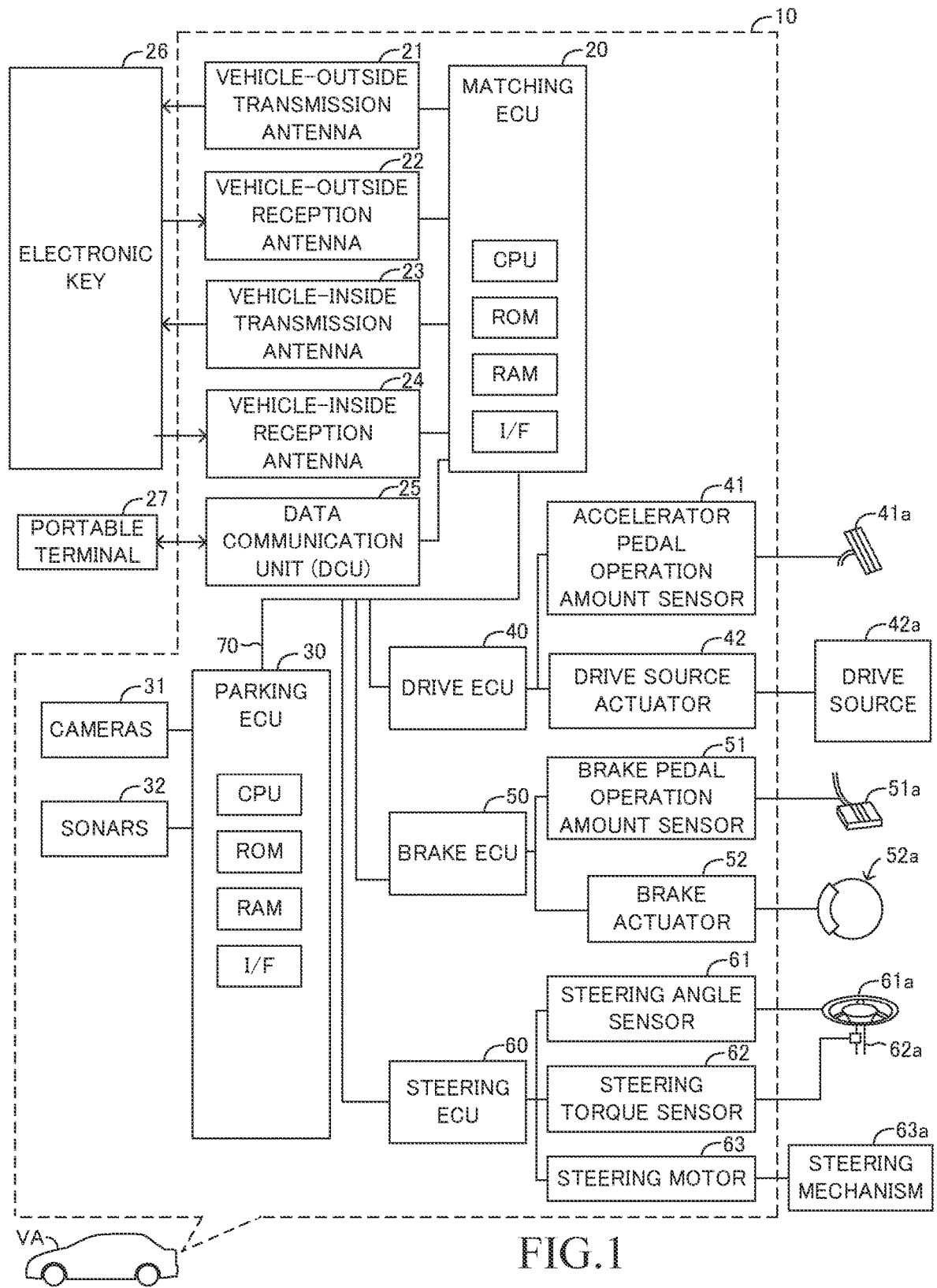
FIG. 1 is a schematic configuration diagram of a vehicle control device according to an embodiment of the present disclosure.

As illustrated in FIG. 1, a vehicle control device 10 according to this embodiment (hereinafter referred to as "the present control device 10") is mounted (applied) to a vehicle VA. The present control device 10 includes a matching ECU 20, a parking ECU 30, a drive ECU 40, a brake ECU 50, and a steering ECU 60. These ECUs 20, 30, 40, 50, and 60 are connected to each other for mutually transmitting and receiving data through a controller area network (CAN) 70.

ECU is an abbreviation for an electric control unit. The ECU is an electronic control circuit including a microcomputer as a main component. The microcomputer includes, for example, a CPU, a ROM, a RAM, and an interface. The CPU executes instructions (routines) stored in the memory (ROM) to implement various functions. All or some of the above-mentioned ECUs 20, 30, 40, 50, and 60 may be integrated into one ECU.

The present control device 10 includes a vehicle-outside transmission antenna 21, a vehicle-outside reception antenna 22, a vehicle-inside transmission antenna 23, a vehicle-inside reception antenna 24, and a data communication unit (hereinafter referred to as "DCU," and sometimes referred to as "communication unit" and "communication module") 25. These components are connected to the matching ECU 20.

The vehicle-outside transmission antenna 21 is an antenna configured to transmit a predetermined wireless signal (for example, a request signal) toward the outside of the vehicle VA (vehicle-outside). The vehicle-outside reception antenna 22 is an antenna configured to receive a wireless signal (for example, response signal) transmitted from a device present outside the vehicle. The vehicle-inside transmission antenna 23 is an antenna configured to transmit a predetermined wireless signal (for example, the request signal) toward the inside of the vehicle VA (vehicle-inside). The vehicle-inside reception antenna 24 is an antenna configured to receive a wireless signal (for example, the response signal) transmitted from a device present inside the vehicle.

The electronic key 26 is a key for the vehicle VA, is carried by a driver (user) of the vehicle VA, and is used, for example, when a door (not shown) of the vehicle VA is to be locked and unlocked. The electronic key 26 is configured to execute wireless communication. When the electronic key 26 receives the request signal from the vehicle VA through the wireless communication, the electronic key 26 transmits, through the wireless communication, a response signal including a key ID (hereinafter sometimes referred to as "identifier") being an identifier set in advance to the electronic key 26. When the electronic key 26 is present outside the vehicle, and is present within a transmission range of the wireless signal of the vehicle-outside transmission antenna 21, the electronic key 26 receives the request signal transmitted from the vehicle-outside transmission antenna 21. The vehicle-outside reception antenna 22 receives the response signal transmitted by the electronic key 26. Meanwhile, when the electronic key 26 is present inside the vehicle, the electronic key 26 receives the request signal transmitted from the vehicle-inside transmission antenna 23, and the vehicle-inside reception antenna 24 receives the response signal transmitted by the electronic key 26.

The matching ECU 20 is configured to transmit the request signal toward the outside of the vehicle and the inside of the vehicle. Further, the matching ECU 20 is configured to be capable of receiving the response signal from the electronic key 26. When the matching ECU 20 receives the response signal, the matching ECU 20 identifies through which of the vehicle-outside reception antenna 22 and the vehicle-inside reception antenna 24 the response signal is received. When the response signal is received through the vehicle-outside reception antenna 22, the matching ECU 20 determines that the electronic key 26 that has transmitted the response signal is present outside the vehicle. When the response signal is received through the vehicle-inside reception antenna 24, the matching ECU 20 determines that the electronic key 26 that has transmitted the response signal is present inside the vehicle. The matching ECU 20 determines whether or not the key ID included in the received response signal matches a vehicle unique ID (vehicle unique identifier) being an identifier set to the vehicle VA in advance. That is, the matching ECU 20 executes key matching, and communicates a result thereof with other ECUs through the CAN 70.

The DCU 25 is configured to be, in the activated state, capable of establishing a wireless connection to a portable terminal (for example, a smartphone or a portable tablet) 27 being a communication device carried by the user. The DCU 25 executes data communication with the portable terminal 27 through widely-known near field communication (for example, Bluetooth (registered trademark)). When the DCU 25 is in an inactivated state, the DCU 25 cannot execute the data communication with the portable terminal 27.

Further, the present control device 10 includes a plurality of cameras 31 and a plurality of sonars 32. The cameras 31 and the sonars 32 are connected to the parking ECU 30.

The plurality of cameras 31 include a front camera, a rear camera, a left side camera, and a right side camera, Each of the plurality of cameras 31 takes an image of a region described below to generate image data each time a predetermined period elapses, and transmits the image data to the parking ECU 30. The front camera takes an image of a region on a front side of the vehicle VA. The rear camera takes an image of a region on a front side of the vehicle VA. The left side camera takes an image of a region on a left side of the vehicle VA. The right side camera takes an image of a region on a right side of the vehicle VA.

The plurality of sonars 32 include a front sonar, a rear sonar, a left side sonar, and a right side sonar. Each of the plurality of sonars 32 transmits a sound wave to a region described below, and receives a reflected wave of the sound wave reflected by an object. Each of the sonars 32 transmits information (that is, sonar data) on the transmitted sound wave and the received reflected wave to the parking ECU 30 each time a predetermined period elapses. The front sonar, the rear sonar, the left side sonar, and the right side sonar transmit the sound waves to a region on the front side of the vehicle VA, a region on the front side of the vehicle VA, a region on the left side of the vehicle VA, and a region on the right side of the vehicle VA, respectively.

The drive ECU 40 is connected to an accelerator pedal operation amount sensor 41 and a drive source actuator 42.

The accelerator pedal operation amount sensor 41 detects an accelerator pedal operation amount AP being an operation amount of an accelerator pedal 41a, and outputs a signal indicating the accelerator pedal operation amount AR The drive ECU 40 acquires the accelerator pedal operation amount AP based on the signal generated by the accelerator pedal operation amount sensor 41. The accelerator pedal 41a is sometimes referred to as "accelerator."

The drive source actuator 42 is connected to a drive source (such as an electric motor and an internal combustion engine) 42a that generates a driving force to be applied to the vehicle. The drive source 42a is sometimes referred to as "drive device." The drive ECU 40 controls the drive source actuator 42 to change an operation state of the drive source 42a, to thereby adjust the driving force to be applied to the vehicle. The drive ECU 40 controls the drive source actuator 42 such that the driving force applied to the vehicle increases as the accelerator pedal operation amount AP increases.

The brake ECU 50 is connected to a brake pedal operation amount sensor 51 and a brake actuator 52.

The brake pedal operation amount sensor 51 detects a brake pedal operation amount BP being an operation amount of a brake pedal 51a, and outputs a signal indicating the brake pedal operation amount BP. The brake ECU 50 acquires the brake pedal operation amount BP based on the signal generated by the brake pedal operation amount sensor 51.

The brake actuator 52 is connected to widely-known friction brake apparatus 52a of a hydraulic type. The brake ECU 50 controls the brake actuator 52 to change a friction braking force generated by each brake apparatus 52a, thereby being capable of adjusting a braking force to be applied to the vehicle. The brake ECU 50 controls the brake actuator 52 such that the braking force applied to the vehicle increases as the brake pedal operation amount BP increases.

The steering ECU 60 is connected to a steering angle sensor 61, a steering torque sensor 62, and a steering motor 63.

The steering angle sensor 61 detects, as a steering angle θs, a rotation angle of a steering wheel 61a with respect to a neutral position, and generates a signal indicating the steering angle θs. The steering ECU 60 acquires the steering angle θs based on the signal generated by the steering angle sensor 61.

The steering torque sensor 62 detects a steering torque Tr indicating torque acting on a steering shaft 62a coupled to the steering wheel 61a, and generates a signal indicating the steering torque Tr. The steering ECU 60 acquires the steering torque Tr based on the signal generated by the steering torque sensor 62.

The steering motor 63 is incorporated so that the torque can be transmitted to "a steering mechanism 63a including the steering wheel 61a, the steering shaft 62a, a steering gear mechanism, and the like" of the vehicle VA. The steering motor 63 generates torque having the direction, the magnitude, and the like controlled by the steering ECU 60 in accordance with "electric power supplied from a vehicle battery (not shown)." A steering assist torque is generated by this torque, or left and right steered wheels are steered (turned).

The steering ECU 60 uses the steering motor 63 to generate the steering assist torque in accordance with the steering torque Tr in a normal state. Further, when the steering ECU 60 receives "a steering command including a target steering angle" from the parking ECU 30, the steering ECU 60 controls the steering motor 63 so that the steering angle θs matches "a target steering angle included in the received steering command," to thereby automatically turn the steered wheels.

Overview of Operation

The present control device 10 is configured to be capable of achieving control (hereinafter referred to as "remote operation control") of stopping the vehicle after causing the vehicle VA to travel to a predetermined target stop position based on an operation on the portable terminal by the user present outside the vehicle. When the remote operation control is finished, the user gets in the vehicle VA, and starts the driving of the vehicle VA by the user. However, when a person other than the user (hereinafter referred to as "another person") gets in the vehicle VA, and executes the driving after the remote operation control is finished, the vehicle may be stolen by the another person.

Figure 2:
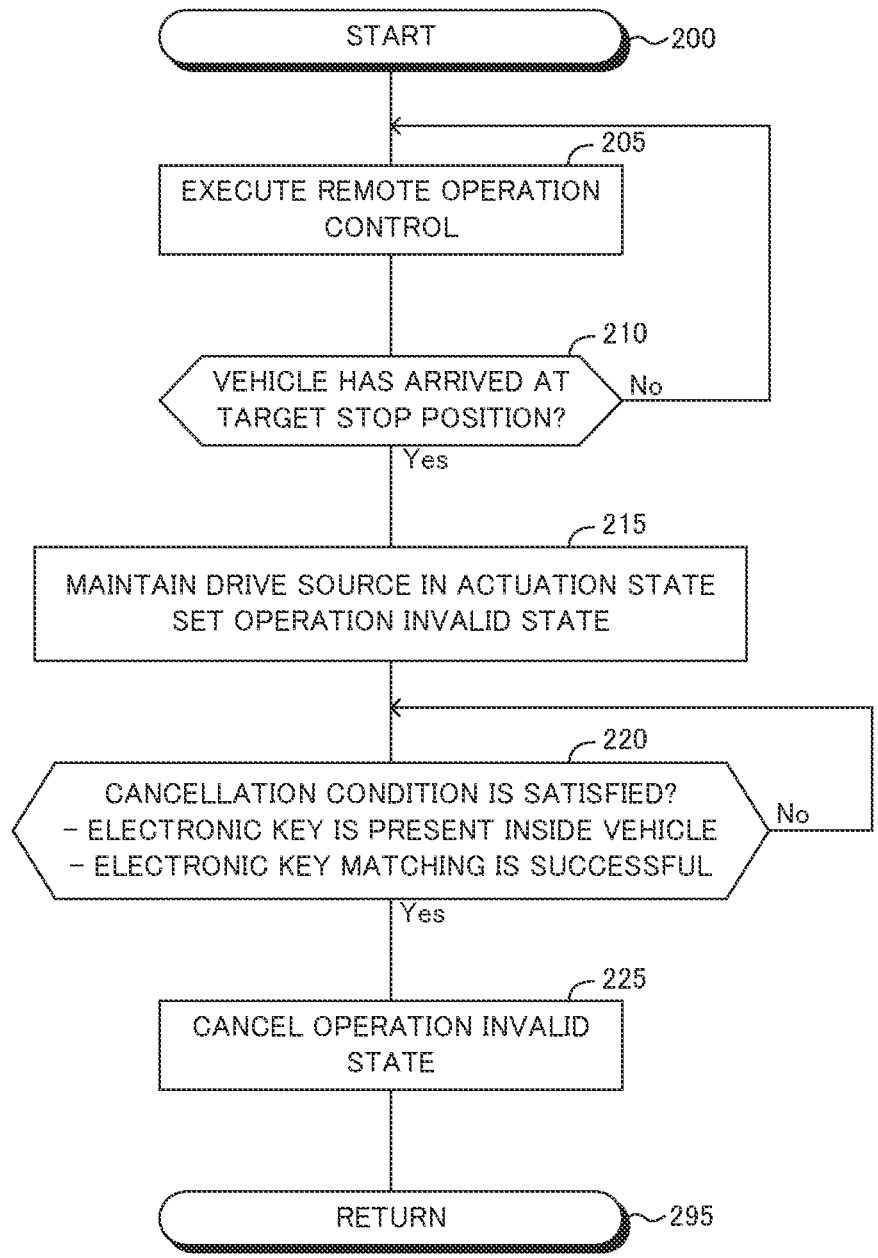
FIG. 2 is a flowchart for illustrating an overview of an operation of the present disclosure.

In order to solve this problem, the present control device 10 operates as conceptually illustrated in a flowchart of FIG. 2. That is, when a start condition for the re note operation control, which is described below, is satisfied through an operation on the portable terminal by the user present outside the vehicle, the present control device 10 proceeds from Step 200 to Step 205, and executes the remote operation control. That is, the present control device 10 changes the state of the drive source 42*a* from "the non-actuation state in which the driving force cannot be applied to the vehicle VA" to "the actuation state in which the driving force can be applied to the vehicle VA," and uses the driving force generated by the drive source 42*a* to automatically move the vehicle VA to the target stop position (see Step 205 and Step 210).

When the vehicle VA arrives at the target stop position, the present control device 10 stops the vehicle VA with the braking force generated by the brake apparatus 52*a*. When the present control device 10 determines that the vehicle VA stops at the target stop position (Yes in Step 210), the present control device 10 sets the state of the drive source 42*a* to an operation invalid state while maintaining the drive source 42*a* in the actuation state (see Step 215). The operation invalid state is a state in which the operation on the accelerator pedal 41*a* is substantially invalidated. That is, the operation invalid state is a state in which the drive source 42*a* does not generate the driving force even when the accelerator pedal 41*a* is operated. "The state of the drive source 42*a* in the actuation state and in the operation invalid state" is hereinafter sometimes referred to as "specific state."

After that, the present control device 10 determines whether or not a predetermined cancellation condition is satisfied (see Step 220). This cancellation condition is a condition that is satisfied when the electronic key 26 having the key ID matching the vehicle ID assigned to the vehicle VA is present inside the vehicle. Thus, this cancellation condition is satisfied when a legitimate user who has caused, outside the vehicle, the present control device 10 to execute the remote operation control for the vehicle VA gets in the vehicle VA while holding the legitimate electronic key 26.

When this cancellation condition is not satisfied, the present control device 10 maintains the state of the drive source 42*a* in the "specific state" (see Step 220).

Meanwhile, when the cancellation condition is satisfied, the present control device 10 cancels the operation invalid state of the drive source 42*a*. That is, the present control device 10 sets the state of the drive source 42*a* to the actuation state and an operation valid state, to thereby allow the drive source 42*a* to generate a driving force in accordance with the accelerator pedal operation amount AR Thus, the legitimate user operates the accelerator pedal 41*a*, thereby being capable of moving the vehicle VA.

As appreciated from the description above, when the vehicle VA has arrived at the target stop position ("Yes" in Step 210), the present control device 10 does not cause the drive source 42*a* to transition to a non-actuation state, but maintains the drive source 42*a* in the actuation state (Step 215). Further, the present control device 10 sets the state of the drive source 42*a* to the operation invalid state in a period from a time when the vehicle VA arrives at the target stop position (arrival time) to a time when the cancellation condition is satisfied (cancellation condition satisfaction time) (Step 215 and Step 225). Thus, even when another person who does not hold the electronic key 26 gets in the vehicle VA, the another person cannot cause the vehicle VA to travel, and it is possible to reduce a risk that the vehicle VA is to be stolen. Further; the drive source 42*a* is maintained in the actuation state, and when the matching of the electronic key present inside the vehicle is successful, the cancellation condition is satisfied without a special operation, and the operation invalid state is consequently cancelled. Thus, when a legitimate user carrying the electronic key 26 gets in the vehicle VA and drives the vehicle VA, the legitimate user does not have to execute an ignition switch operation to start up the drive source 42*a*.

(Operation Example)

Figure 3:
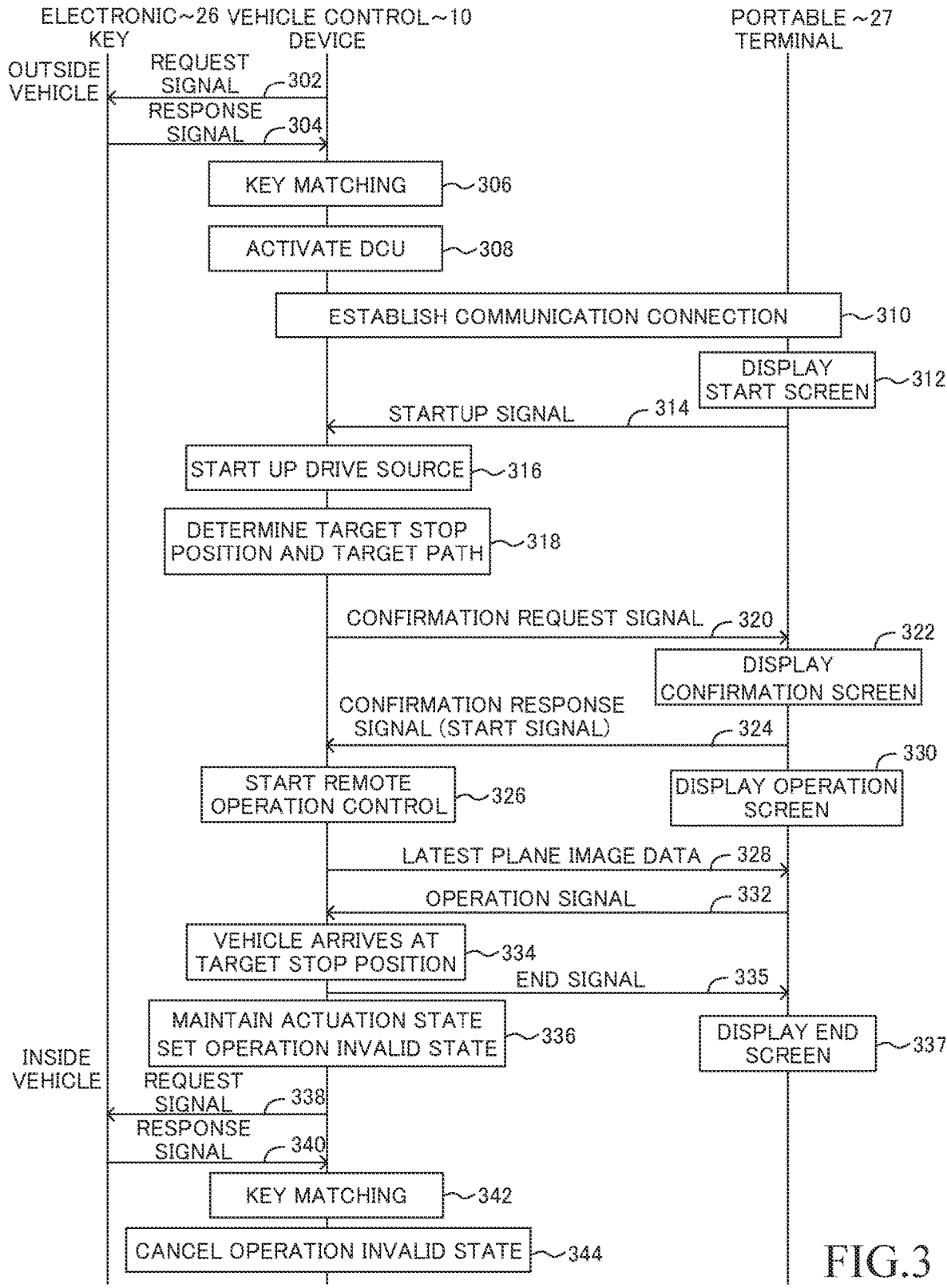
FIG. 3 is a sequence diagram of an electronic key, the vehicle control device, and a portable terminal.

With reference to FIG. 3 and FIG. 4, a specific description is given of an operation of the present control device 10, the electronic key 26, and the portable terminal 27.

The present control device 10 transmits a request signal from the vehicle-outside transmission antenna 21 and the vehicle-inside transmission antenna 23 each time a predetermined period elapses (Step 302). It is assumed that the user is present outside the vehicle, the electronic key 26 and the portable terminal 27 are also present outside the vehicle, and a remote control application program of the portable terminal 27 is activated.

In this state, when the electronic key 26 receives the request signal, the electronic key 26 transmits a response signal including the key ID set in advance to the electronic key 26 (Step 304).

When the vehicle-outside reception antenna 22 receives the response signal, the present control device 10 executes the key matching of determining whether or not the key ID matches the vehicle unique ID set in advance to the present control device 10 (Step 306). When the key ID and the vehicle unique ID match each other (that is, the key matching is successful), the present control device 10 determines that the activation condition for activating the DCU 25 is satisfied, and activates the DCU 25 (Step 308). When the DCU 25 is activated in a case in which the portable terminal 27 has been registered to (paired with) the DCU 25 in advance, the communication connection between the DCU 25 and the portable terminal 27 is established (Step 310). As a result, the state of the DCU 25 transitions from the state in which the DCU 25 cannot communicate with the portable terminal 27 to the state in which the DCU 25 can communicate with the portable terminal 27. When the communication connection is established, the portable terminal 27 displays a start screen 400 of FIG. 4A on a display 270 of the portable terminal 27 (see FIG. 4A to FIG. 4D) (Step 312). The display 270 is a display device of a touch panel type.

Figure 4A:
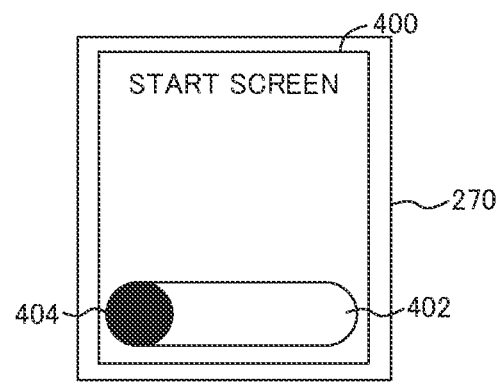
FIG. 4A is an explanatory view of a start screen displayed on the portable terminal.

As illustrated in FIG. 4A, the start screen 400 includes a slide operation region 402. In an initial state of the start screen 400, an operation display element 404 is positioned at a left end of the slide operation region 402. When the user outside the vehicle operates the portable terminal 27 in such a manner as to slide the operation display element 404 to a right end of the slide operation region 402, the portable terminal 27 determines that a predetermined startup operation has been executed, and transmits a startup signal to the DCU 25 (Step 314).

Incidentally, in a case in which the drive source 42a is in the non-actuation state, when any one of a condition S1 and a condition S2 described below is satisfied, the present control device 10 determines that a startup condition is satisfied, and changes the state of the drive source 42a from the non-actuation state to the actuation state.

Condition S1: A condition satisfied when the electronic key 26 is present inside the vehicle, the key matching is successful, and an ignition switch (also referred to as "startup switch" or "ready switch") (not shown) provided inside the vehicle VA is changed from an OFF position to an ON position.

Condition S2: A condition satisfied when the electronic key 26 is present outside the vehicle, the key matching is successful, and the startup operation is executed on the portable terminal 27.

The case in which the DCU 25 receives the startup signal is a case in which the electronic key 26 is present outside the vehicle, the key matching is successful, and the startup operation is executed on the portable terminal 27. Thus, when the DCU 25 receives the startup signal, the present control device 10 determines that the startup condition is satisfied as a result of the satisfaction of the condition S2. Thus, the present control device 10 starts up the drive source 42a, to thereby cause the state of the drive source 42a to transition from the non-actuation state to the actuation state (Step 316).

When the drive source 42a is an internal combustion engine, a starter motor (not shown) rotates a crankshaft of the internal combustion engine, to thereby start up the internal combustion engine. Meanwhile, when the drive source 42a is an electric motor, a relay circuit (not shown) is controlled so that the drive source 42a is changed from "a non-current supply state in which electrical connection between the electric motor and a battery (not shown) is shut off" to "a current supply state in which the electric motor and the battery (not shown) are electrically connected to each other," to thereby start up the electric motor. When the drive source 42a is formed of an internal combustion engine and an electric motor (when the vehicle VA is a hybrid vehicle), the electric motor that generates at least a driving force for starting the vehicle is started up.

Further, the present control device 10 determines the target stop position and a target path based on the image data and the sonar data (Step 318). After that, the present control device 10 transmits a confirmation request signal to the portable terminal 27 (Step 320). The confirmation request signal includes image data relating to a confirmation image. The confirmation image is an image formed by plotting (superimposing) the target stop position and the target path on "a plane image at the time when a region within a predetermined range from the vehicle VA is viewed from directly above," and is generated based on the image data generated by the plurality of cameras 31.

Figure 4B:
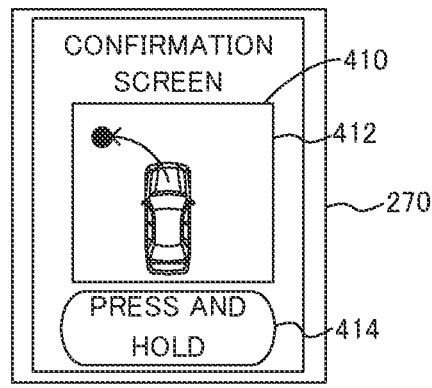
FIG. 4B is an explanatory view of a confirmation screen displayed on the portable terminal.

When the portable terminal 27 receives the confirmation request signal, the portable terminal 27 displays a confirmation screen 410 of FIG. 4B on the display 270 (Step 322). As illustrated in FIG. 4B, the confirmation screen 410 includes a stop position display region 412 and a press-and-hold button 414. In the stop position display region 412, the confirmation image is displayed. When the user views the confirmation image displayed in the stop position display region 412, and accepts the target stop position and the target path, the user touches the press-and-hold button 414. When the press-and-hold button 414 is touched for a period equal to or longer than a predetermined period, the portable terminal 27 determines that the predetermined start operation has been executed, and transmits a confirmation response signal (start signal) to the DCU 25 (Step 324).

Figure 4C:
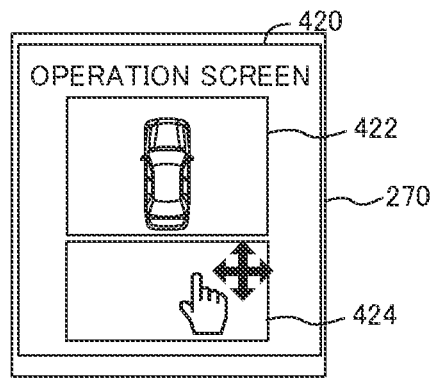
FIG. 4C is an explanatory view of an operations screen displayed on the portable terminal.

When the DCU 25 receives the confirmation response signal (start signal), the present control device 10 determines that the predetermined start condition is satisfied, and thus starts remote operation control (Step 326). The present control device 10 transmits the latest plane image data to the portable terminal 27 each time a predetermined period elapses during the execution of the remote operation control (Step 328). When the start operation is executed on the confirmation screen 410, the portable terminal 27 displays an operation screen 420 (see FIG. 4C) on the display 270 (Step 330). As illustrated in FIG. 4C, the operation screen 420 includes a plane image display region 422 and an operation region 424. In the plane image display region 422, there is displayed a plane image based on the latest plane image data received by the portable terminal 27. The image displayed in the plane image display region 422 is updated each time the latest plane image data is received. When the user is tracing the operation region 424 with the finger, and the touched position in the operation region 424 is thus continuously changing, the portable terminal 27 continues to transmit an operation signal to the DCU 25 each time a predetermined period elapses (Step 332).

When the present control device 10 once starts the remote operation control, the present control device 10 causes the vehicle VA to travel along the target path as long as the operation signal is received until the vehicle VA arrives at the target stop position. In other words, the user is required to continue to trace the operation region 424 until the vehicle VA arrives at the target stop position. When the vehicle VA arrives at a deceleration start position being a position before the target stop position by a predetermined distance along the target path, the present control device 10 starts decelerating the vehicle VA, and stops the vehicle VA at the target stop position.

When the present control device 10 determines that the vehicle VA arrives at the target stop position (Step 334), the present control device 10 transmits an end signal to the portable terminal 27 (Step 335). Further, the present control device 10 does not cause the drive source 42a to transition to the non-actuation state, but maintains the drive source 42a in the actuation state, and sets the state of the drive source 42a to the specific state (state being the actuation state and the operation invalid state) (Step 336).

Figure 4D:
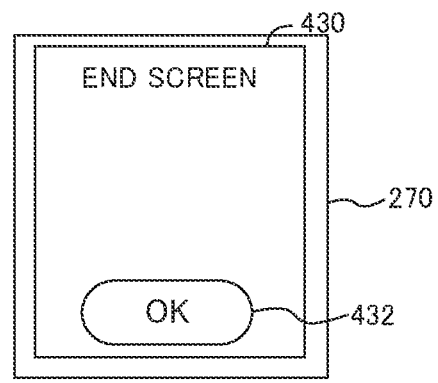
FIG. 4D is an explanatory view of an end screen displayed on the portable terminal.

When the portable terminal 27 receives the end signal, the portable terminal 27 displays an end screen 430 (see FIG. 4D) on the display 270. As illustrated in FIG. 4D, the end screen 430 includes an OK button 432. When the OK button 432 is operated, the portable terminal 27 finishes the remote control application program. The user can recognize that the vehicle VA arrives at the target stop position, and the remote operation control has thus been finished when the end screen 430 is displayed.

The user gets in the vehicle VA stopping at the target stop position. When the user has gotten in the vehicle VA, the electronic key 26 (and the portable terminal 27) is present inside the vehicle. When the electronic key 26, which is now present inside the vehicle, receives the request signal transmitted from the vehicle-inside transmission antenna 23 (Step 338), the electronic key 26 transmits the response signal (Step 340). When the vehicle-inside reception antenna 24 receives the response signal, the present control device 10 executes the key matching (Step 342).

Incidentally, when both of the following condition K1 and condition K2 are satisfied, the present control device 10 determines that a cancellation condition is satisfied.

Condition K1: A condition satisfied when the vehicle-inside reception antenna 24 receives the response signal.

Condition K2: A condition satisfied when the key ID included in the response signal received by the vehicle-inside reception antenna 24 and the vehicle unique ID set in advance to the present control device 10 match each other.

When the key matching is successful in Step 342, both of the condition K1 and the condition K2 are satisfied, and the cancellation condition is thus satisfied. When the cancellation condition is satisfied, the present control device 10 cancels the operation invalid state (Step 344).

As described above, the present control device 10 sets the state of the drive source 42a to the specific state in the period from the arrival of the vehicle VA at the target stop position to the satisfaction of the cancellation condition, and it is thus possible to eliminate necessity of the startup operation while reducing the risk of theft of the vehicle VA.

Further, the present control device 10 starts up the drive source 42a when the startup operation is executed on the portable terminal 27, and starts the remote operation control when the start operation is executed on the portable terminal 27 after the startup operation has been executed on the portable terminal 27. As a result, the user can cause the present control device 10 to start the remote operation control while the user stays outside the vehicle without getting in the vehicle VA. Thus, even when there is no space for opening the door for a driver's seat of the vehicle VA, and the user cannot thus get in the vehicle VA, the user can start the remote operation control while being present outside the vehicle. Then, the user can stop the vehicle at the target stop position through the remote operation control, and can get in the vehicle that has stopped at the target stop position.

The present control device 10 confirms that the user holding the legitimate qualification is present outside the vehicle VA in the range of the predetermined distance from the vehicle when the electronic key 26 is present within the transmission range of the vehicle-outside transmission antenna 21, and the key matching for the electronic key 26 is successful, and activates the DCU 25. As a result, it is not required to always maintain the DCU 25 activated, and electric power consumed by the DCU 25 can thus be reduced. Further, the DCU 25 is not activated unless the key matching for the electronic key 26 is successful, and the present control device 10 cannot communicate with the portable terminal 27. When the DCU 25 has not been activated, the drive source 42a cannot be started up through the operation on the portable terminal 27, and the remote operation control cannot be started. Thus, unless the legitimate electronic key 26 is present within the transmission range, the drive source 42a cannot be started up, the remote operation control cannot be started, and the risk of the theft of the vehicle can thus be reduced.

(Specific Operation)
<Key Matching Routine>

The CPU of the matching ECU 20 ("first CPU" hereinafter refers to the CPU of the matching ECU 20 unless otherwise specified) executes a key matching routine illustrated in a flowchart of FIG. 5 each time a predetermined period elapses.

Figure 5:
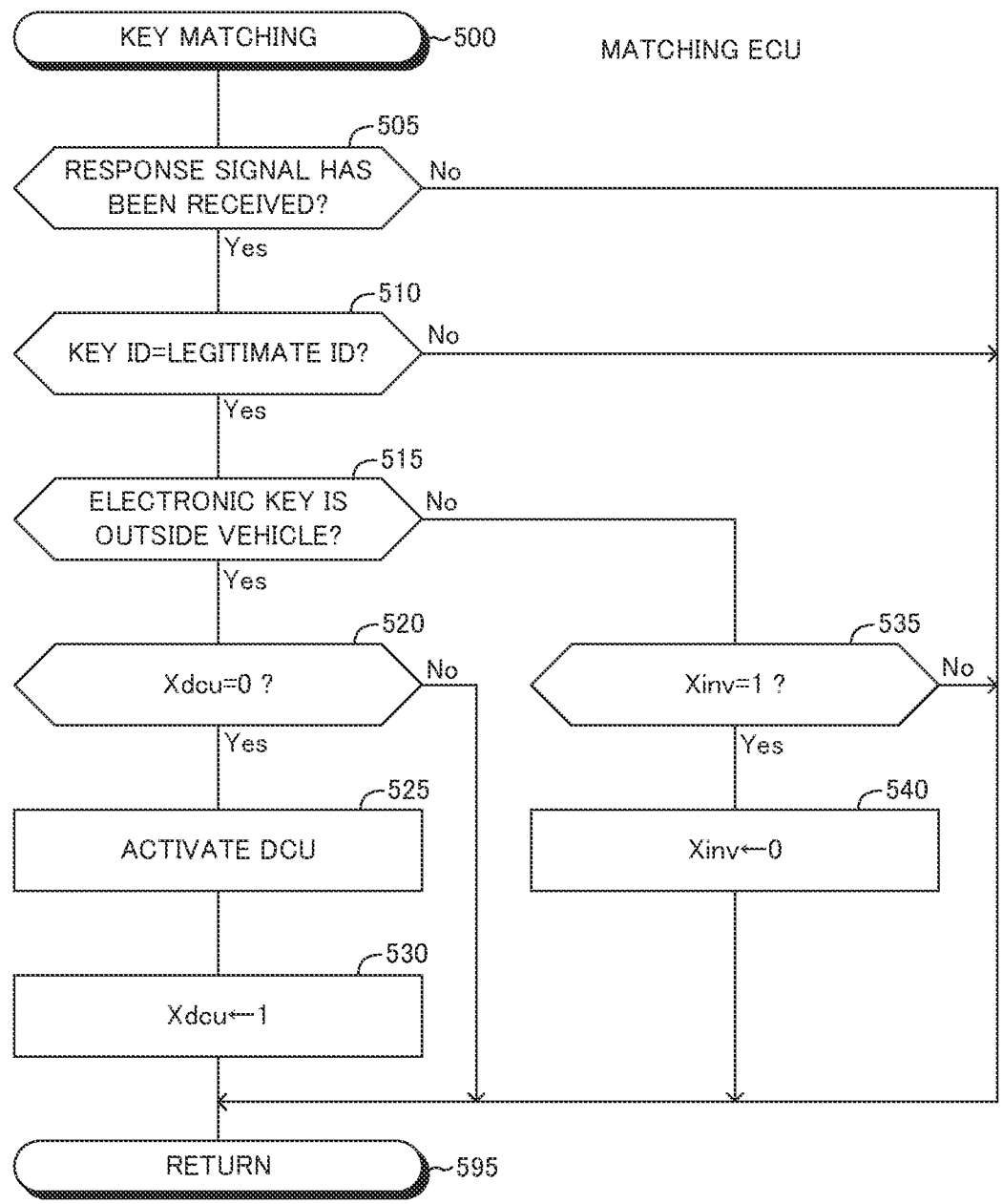
FIG. 5 is a flowchart for illustrating a key matching routine executed by a CPU of a matching ECU.

Thus, the first CPU starts processing from Step 500 of FIG. 5 at a predetermined timing, proceeds to Step 505, and determines whether or not the response signal has been received from the electronic key 26 in a period from a time at which this routine has been executed previously to the current time.

When the response signal has not been received in that period, the first CPU makes a determination of "No" in Step 505, proceeds to Step 595, and temporarily finishes this routine.

Meanwhile, when the first CPU has received the response signal in the above-mentioned period, the first CPU makes a determination of "Yes" in Step 505, and proceeds to Step 510. In Step 510, the first CPU determines whether or not the key ID included in the received response signal and the vehicle unique ID stored in advance in the ROM of the matching ECU 20 match each other.

When the key ID and the vehicle unique ID do not match each other, the first CPU makes a determination of "No" in Step 510, proceeds to Step 595, and temporarily finishes this routine.

Meanwhile, when the key ID and the vehicle unique ID match each other, the first CPU makes a determination of "Yes" in Step 510, and proceeds to Step 515, In Step 515, the first CPU determines whether or not the electronic key 26 that has transmitted the response signal is outside the vehicle. More specifically, when the vehicle-outside reception antenna 22 has received the response signal, the first CPU determines that the electronic key 26 is present outside the vehicle. When the vehicle-inside reception antenna 24 has received the response signal, the first CPU determines that the electronic key 26 is present inside the vehicle.

When the electronic key 26 is present outside the vehicle, the first CPU makes a determination of "Yes" in Step 515, and determines whether or not the value of an activation flag Xdcu is "0." The value of the activation flag Xdcu is set to "1" when the DCU 25 has been activated (see Step 530 below). The value of the activation flag Xdcu is set to "0" when the DCU 25 has not been activated. When the ignition switch is changed from the ON position to the OFF position, the DCU 25 is brought into the inactivated state, and the value of the activation flag Xdcu is thus set to "0."

When the value of the activation flag Xdcu is "0," the first CPU makes a determination of "Yes" in Step 520, and executes processing in Step 525 and Step 530.

Step 525: The first CPU activates the DCU 25.

Step 530: The first CPU sets the value of the activation flag Xdcu to "1."

After that, the first CPU proceeds to Step 595, and temporarily finishes this routine. When the DCU 25 is activated, the DCU 25 is brought into the activated state in which the DCU 25 establishes the communication connection with the portable terminal 27, thereby being capable of communicating with the portable terminal 27.

Meanwhile, when the first CPU proceeds to Step 520, and the value of the activation flag Xdcu is "1," the first CPU makes a determination of "No" in Step 520, proceeds to Step 595, and temporarily finishes this routine.

Meanwhile, when the first CPU proceeds to Step 515, and the electronic key 26 is present inside the vehicle, the first CPU makes a determination of "No" in Step 515, and proceeds to Step 535. In Step 535, the first CPU determines whether or not the value of an invalidity flag Xinv is "1."

Figure 10:
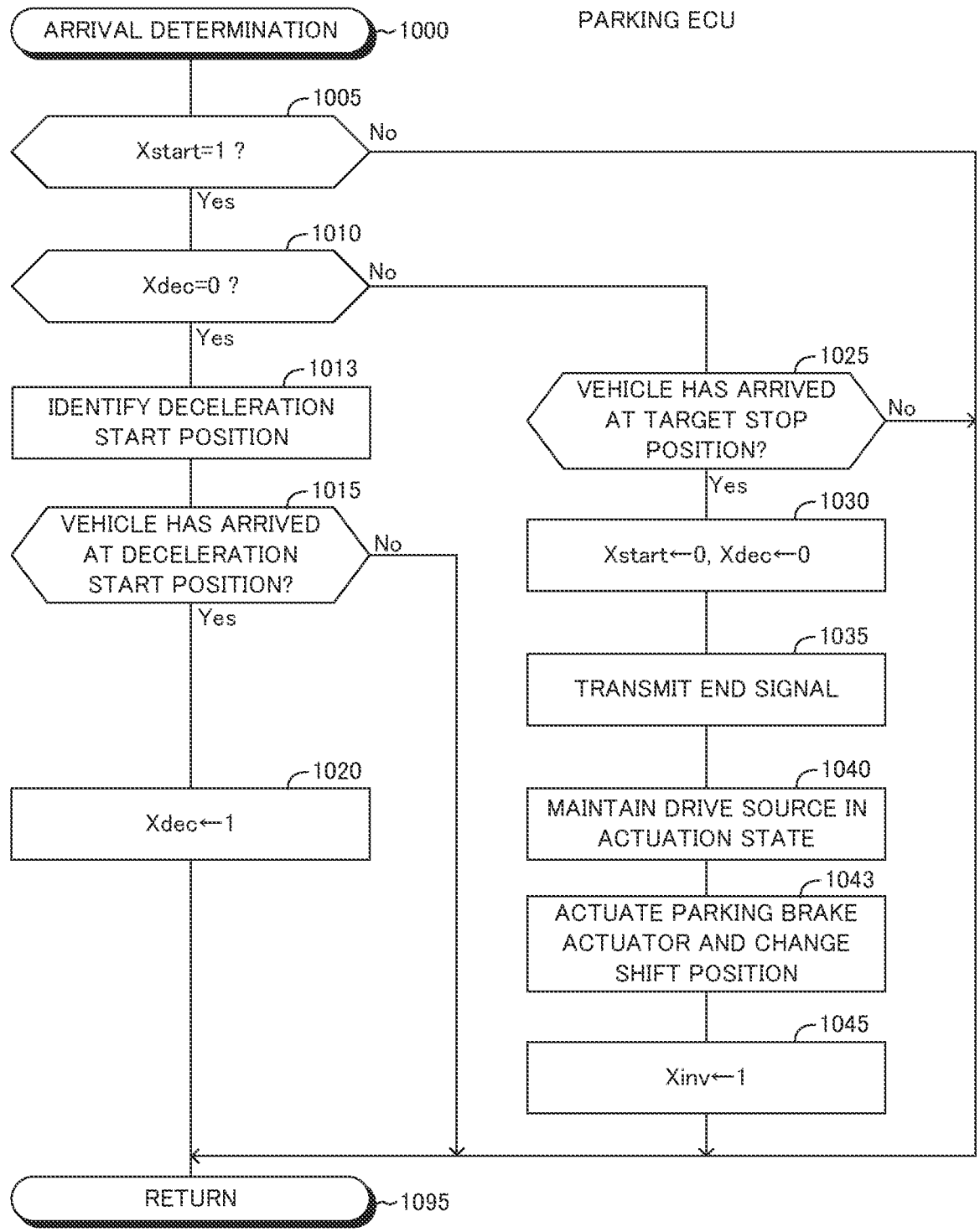
FIG. 10 is a flowchart for illustrating an arrival determination routine executed by the CPU of the parking ECU.

The value of the invalidity flag Xinv is set to "1" when the state of the vehicle VA is in the operation invalid state (see Step 1045 of FIG. 10). The value thereof is set to "0" when the state of the vehicle VA is not in the operation invalid state (see Step 540). The value of the invalidity flag Xinv is set to "0" by an initial routine executed by the CPU when the ignition switch is changed from the OFF position to the ON position.

When the value of the invalidity flag Xinv is "1," the first CPU makes a determination of "Yes" in Step 535, proceeds to Step 540, and sets the value of the invalidity flag Xinv to "0." As a result, the operation invalid state is cancelled. After that, the first CPU proceeds to Step 595, and temporarily finishes this outline.

Meanwhile, when the value of the invalidity flag Xinv is "1," the first CPU makes a determination of "No" in Step 535, proceeds to Step 595, and temporarily finishes this routine.

<Startup Control Routine>

Figure 6:
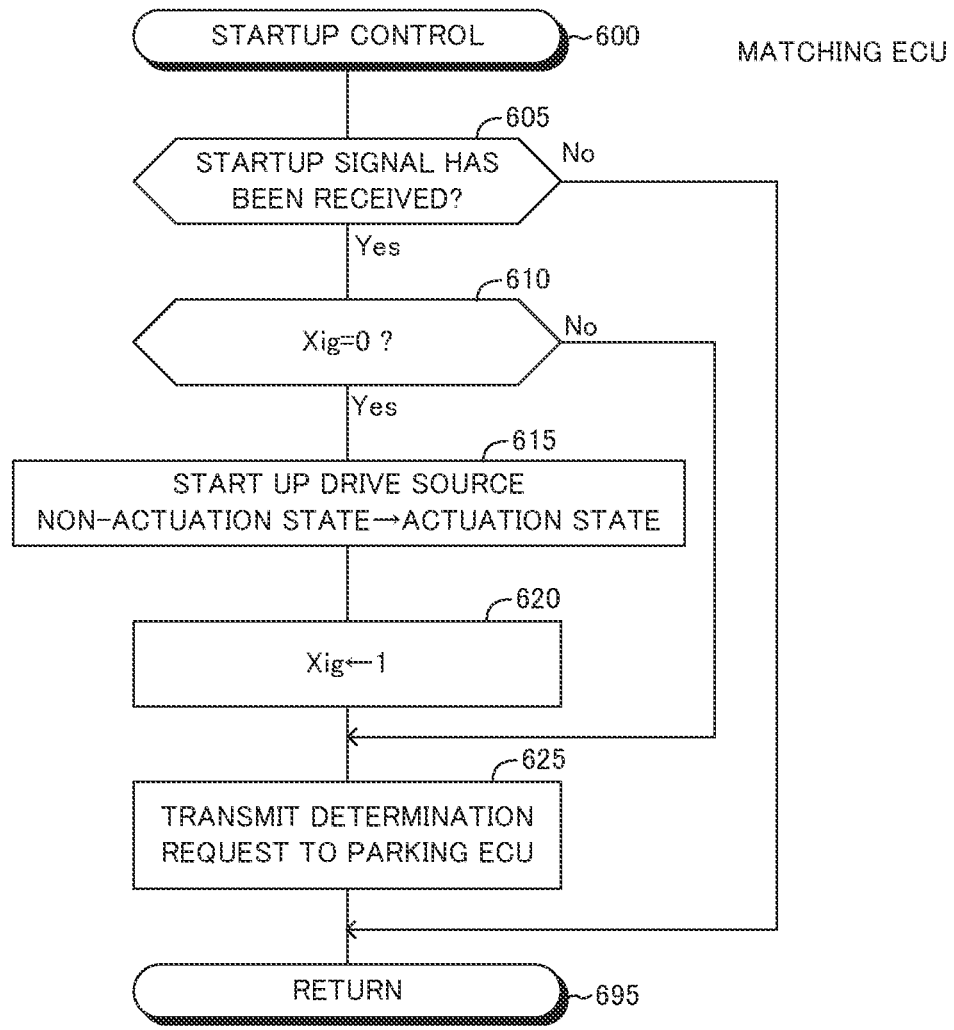
FIG. 6 is a flowchart for illustrating a startup control outline executed by the CPU of the matching ECU.

The first CPU executes a startup control routine of FIG. 6 illustrated as a flowchart each time a predetermined period elapses.

Thus, the first CPU starts processing from Step 600 of FIG. 6 at a predetermined timing, proceeds to Step 605, and determines whether or not the DCU 25 has received the startup signal from the portable terminal 27 in a period from a time at which this routine has been executed previously to the current time.

When the DCU 25 has not received the startup signal in that period, the first CPU makes a determination of "No" in Step 605, proceeds to Step 695, and temporarily finishes this routine.

Meanwhile, when the DCU 25 has received the startup signal in the above-mentioned period, the first CPU makes a determination of "Yes" in Step 605, and proceeds to Step 610. In Step 610, the first CPU determines whether or not the value of a startup flag Xig is "0."

The value of the startup flag Xig is set to "1" when the drive source 42a is in the actuation state (see Step 620). The value thereof is set to "0" when the drive source 42a is in the non-actuation state. When the ignition switch is changed from the OFF position to the ON position, the drive source 42a is started up, and is brought into the actuation state, and the value of the startup flag Xig is thus set to "1" by the initial routine. When the ignition switch is changed from the ON position to the OFF position, the drive source 42a is brought into the non-actuation state, and the value of the startup flag Xig is thus set to "1." When the drive source 42a is in the non-actuation state, the matching ECU 20 is activated, but other ECUs 30, 40, 50, and 60 are not activated. These ECUs 30, 40, 50, and 60 are activated when the drive source 42a is brought into the actuation state.

When the value of the startup flag Xig is "0," the first CPU makes a determination of "Yes" in Step 610, and executes processing in Step 615 to Step 625 in this order.

Step 615: The first CPU starts up the drive source 42a, to thereby cause the drive source 42a to transition from the nor-actuation state to the actuation state.

Step 620: The first CPU sets the value of the startup flag Xig to "1."

Step 625: The first CPU transmits a determination request for causing the parking ECU 30 to determine the target stop position and the target path to the parking ECU 30.

After that, the first CPU proceeds to Step 695, and temporarily finishes this routine.

Meanwhile, when the first CPU proceeds to Step 610, and the value of the startup flag Xig is "1," the first CPU makes a determination of "No" in Step 610, executes the processing in Step 625, proceeds to Step 695, and temporarily finishes this routine.

<Position and Path Determination Routine>

The CPU of the parking ECU 30 ("second CPU" hereinafter refers to the CPU of the parking ECU 30 unless otherwise specified) executes a position and path determination routine illustrated in a flowchart of FIG. 7 each time a predetermined period elapses.

Figure 7:
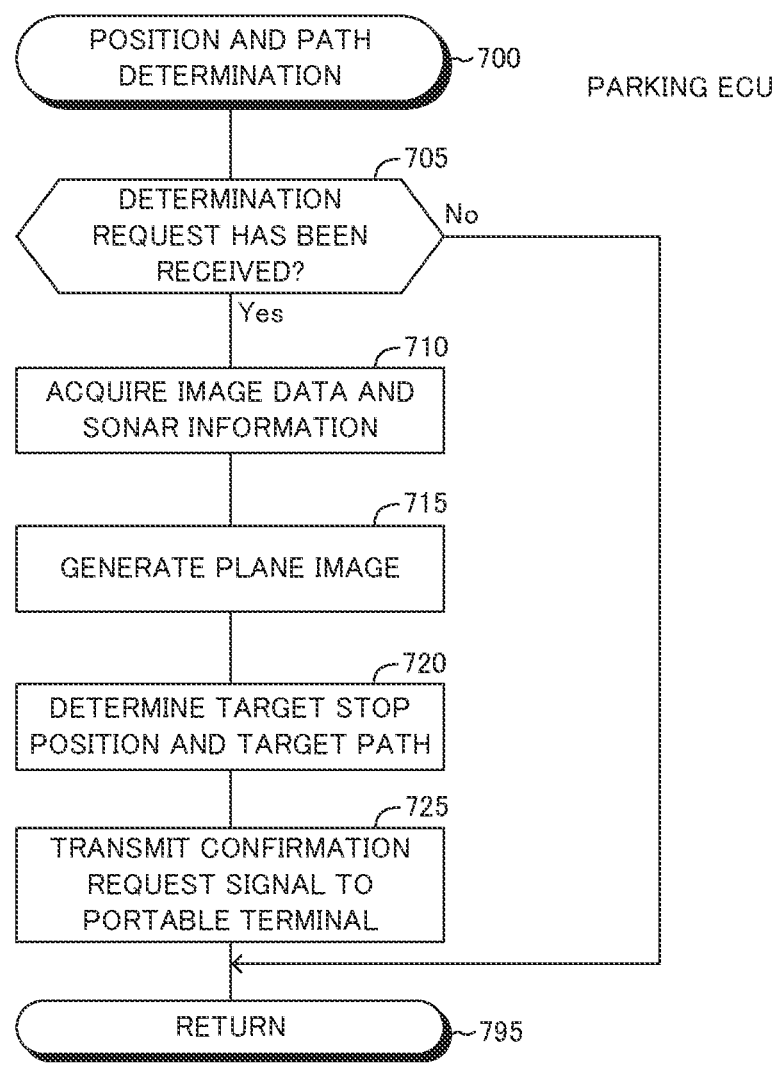
FIG. 7 is a flowchart for illustrating a position and path determination routine executed by a CPU of a parking ECU.

Thus, the second CPU starts processing from Step 700 of FIG. 7 at a predetermined timing, proceeds to Step 705, and determines whether or not the determination request has been received from the matching ECU 20 in a period from a time at which this routine has been executed previously to the current time.

When the second CPU receives the determination request from the matching ECU 20 in the above-mentioned period, the second CPU makes a determination of "Yes" in Step 705, and executes processing in Step 710 to Step 725 in this order.

Step 710: The second CPU acquires the image data from the cameras 31 and the sonar data from the sonars 32.

Step 715: The second CPU generates the plane image based on the image data.

Step 720: The second CPU identifies obstacles present around the vehicle VA based on the image data and the sonar data, to thereby determine the target path and the target stop position. The target stop position is determined to be a position at which there are not obstacles in a predetermined range around the vehicle VA parking at the target stop position, and a position at which the vehicle VA can arrive without contact with obstacles. The predetermined range is set to such a range that the door of the vehicle VA stopping at the target stop position can be opened. The target path is a path along which the vehicle VA can arrive at the target stop position, and the vehicle VA can travel without contact with the obstacles. Further, the target stop position and the target path are determined so that a front-and-rear direction (front-and-rear direction upon stopping) of the vehicle VA stopping at the target stop position is perpendicular to a current front-and-rear direction of the vehicle VA (current front-and-rear direction). The target stop position on the confirmation screen 410 of FIG. 4B is determined so that the front-and-rear direction upon stopping is rotated counterclockwise by 90 degrees from the current front-and-rear direction. The target path is determined so that the vehicle VA travels while turning left.

Step 725: The second CPU trans to the portable terminal 27, the confirmation request signal including the image data relating to the confirmation image formed by superimposing the target stop position and the target path on the plane image generated in Step 715.

After that, the second CPU proceeds to Step 795, and temporarily finishes this routine.

Meanwhile, when the second CPU proceeds to Step 705, and has not received the determination request from the matching ECU 20, the second CPU makes a determination of "No" in Step 705, proceeds to Step 795, and temporarily finishes this routine.

<Start Control Routine>

Figure 8:
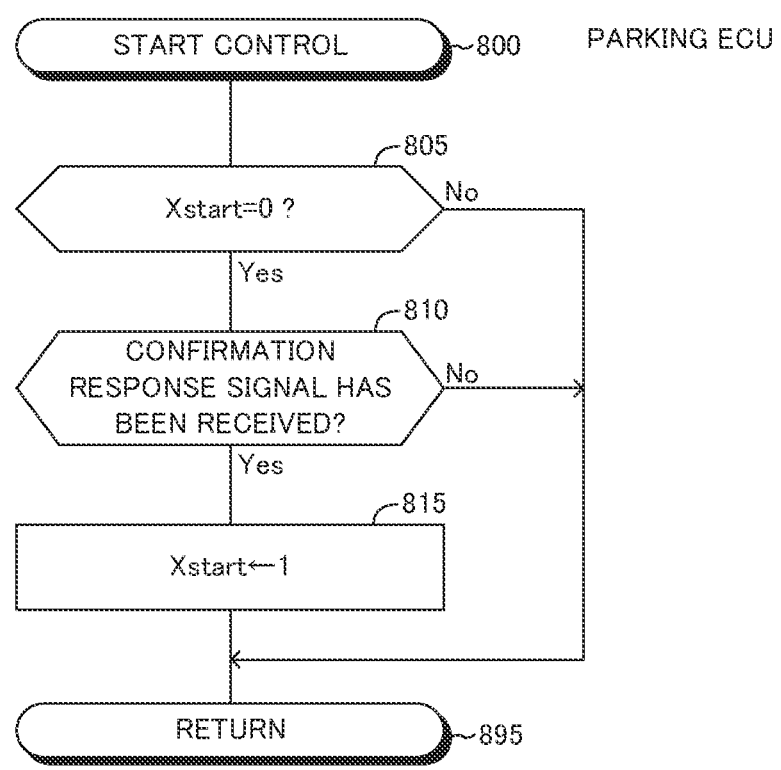
FIG. 8 is a flowchart for illustrating a start control routine executed by the CPU of the parking ECU.

The second CPU executes a start control routine of FIG. 8 illustrated as a flowchart each time a predetermined period elapses.

Thus, the second CPU starts processing from Step 800 of FIG. 8 at a predetermined timing, proceeds to Step 805, and determines whether or not the value of a start flag Xstart is "0." The value of the start flag Xstart is set to "1" when the remote operation control is started (see Step 815). The value thereof is set to "0" when the vehicle VA arrives at the target stop position, and the remote operation control is finished (see Step 1030 of FIG. 10). The value of the start flag Xstart is set to "0" by the initial routine.

When the value of the start flag Xstart is "0," the second CPU makes a determination of "Yes" in Step 805, and proceeds to Step 810. In Step 810, the second CPU determines whether or not the confirmation response signal (start signal) has been received from the portable terminal 27 in a period from a time when this routine has been previously executed to the current time.

When the confirmation response signal has been received from the portable terminal 27 in the above-mentioned period, the second CPU makes a determination of "Yes" in Step 810, proceeds to Step 815, and sets the value of the start flag Xstart to "1." After that, the second CPU proceeds to Step 895, and temporarily finishes this routine.

Meanwhile, when the confirmation response signal has not been received from the portable terminal 27 in the above-mentioned period, the second CPU makes a determination of "No" in Step 810, proceeds to Step 895, and temporarily finishes this routine.

Meanwhile, when the second CPU proceeds to Step 805, and the value of the start flag Xstart is "1," the second CPU makes a determination of "No" in Step 805, proceeds to Step 895, and temporarily finishes this routine.

<Remote Operation Control Routine>

Figure 9:
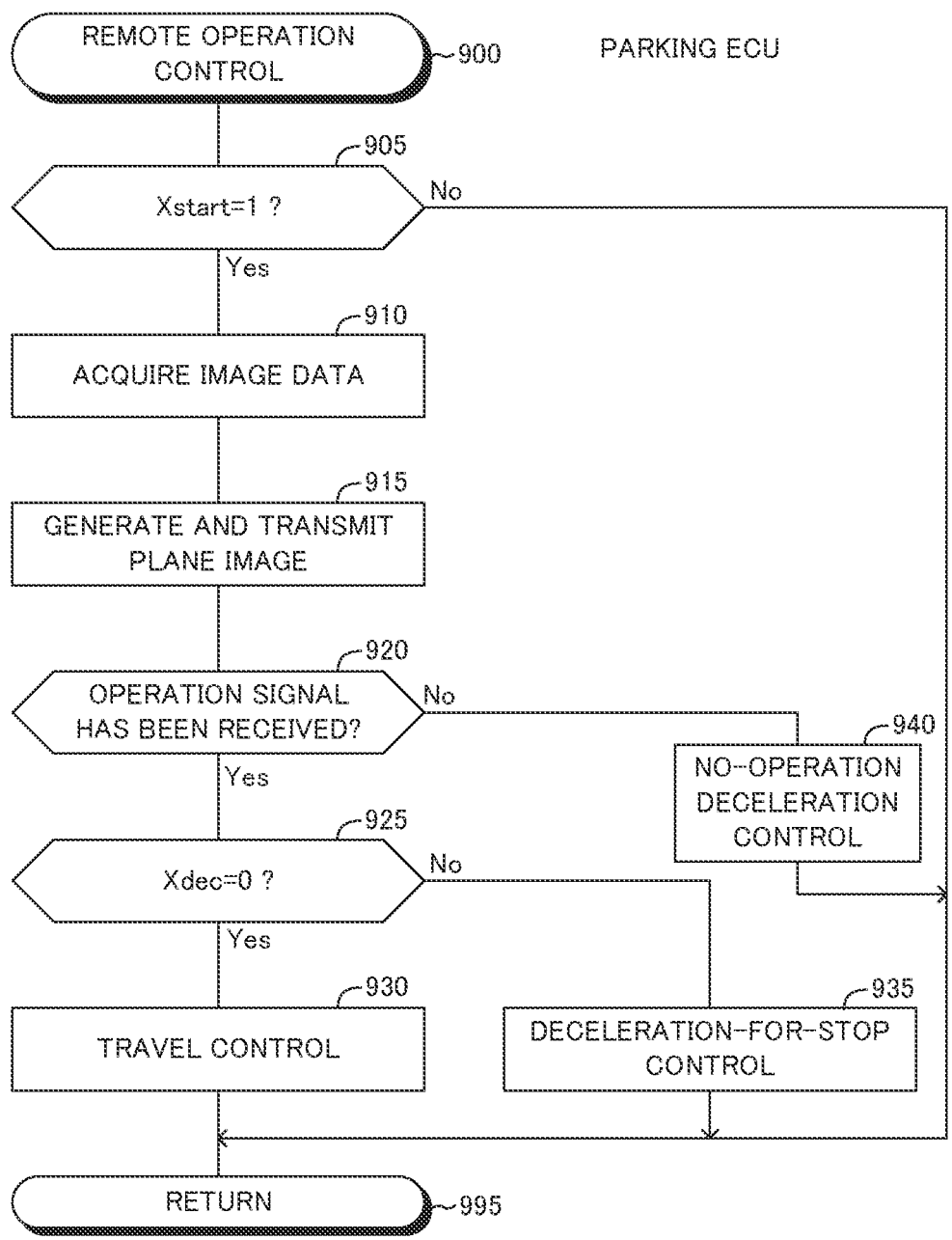
FIG. 9 is a flowchart for illustrating a remote operation control routine executed by the CPU of the parking ECU.

The second CPU executes a remote operation control routine of FIG. 9 illustrated as a flowchart each time a predetermined period elapses.

Thus, the second CPU starts processing from Step 900 at a predetermined timing, proceeds to Step 905, and determines whether or not the value of the start flag Xstart is "1." When the value of the start flag Xstart is "0," the second CPU makes a determination of "No" in Step 905, proceeds to Step 995, and temporarily finishes this routine.

Meanwhile, when the value of the start flag Xstart is "1," the second CPU executes processing in Step 910 to Step 920 in this order.

Step 910: The second CPU acquires the image data from the cameras 31.

Step 915: The second CPU generates the plane image based on the image data, and transmits, to the portable terminal 27, image data (latest plane image data) relating to the generated plane image.

Step 920: The second CPU determines whether or not the operation signal has been received from the portable terminal 27 in a period from a time when this routine has been previously executed to the current time.

When the second CPU has received the operation signal from the portable terminal 27 in the above-mentioned period, the second CPU makes a determination of "Yes" in Step 920, and proceeds to Step 925. In Step 925, the second CPU determines whether or not the value of a deceleration flag Xdec is "0." The value of the deceleration flag Xdec is set to "1" when the vehicle VA arrives at the deceleration start position (see Step 1020 of FIG. 10). The value thereof is set to "0" when the vehicle VA arrives at the target stop position (see Step 1030 of FIG. 10). The value of the deceleration flag Xdec is set to "0" also by the initial routine. The deceleration start position is the position before the target stop position by a predetermined deceleration distance along the target path. A detailed description is below given of the deceleration start position.

When the value of the deceleration flag Xdec is "0," the second CPU makes a determination of "Yes" in Step 925, proceeds to Step 930, and executes travel control such that the vehicle VA travels along the target path at a target speed Vst set in advance. After that, the second CPU proceeds to Step 995, and temporarily finishes this routine.

A specific description is now given of the travel control. The second CPU acquires a vehicle speed Vs indicating a current speed of the vehicle VA from a vehicle speed sensor (not shown), and calculates a target acceleration Gt for causing the vehicle speed Vs to match the predetermined target speed Vst. After that, the second CPU transmits the target acceleration Gt to the drive ECU 40 and the brake ECU 50. The drive ECU 40 controls the drive source actuator 42 so that an acceleration G of the vehicle VA matches the received target acceleration Gt. The brake ECU 50 controls the brake actuator 52 so that the acceleration G of the vehicle VA matches the received target acceleration Gt. The acceleration of the vehicle VA is obtained by differentiating the vehicle speed Vs with respect to time. Further, the second CPU calculates a target steering angle for the vehicle VA to travel along the target path, and transmits the target steering angle to the steering ECU 60. The steering ECU 60 controls the steering motor 63 so that the steering angle θs matches the target steering angle.

Meanwhile, when the second CPU proceeds to Step 925, and the value of the deceleration flag Xdec is "1," the second CPU makes a determination of "No" in Step 925, proceeds to Step 935, and executes a deceleration-for-stop control of stopping the vehicle VA at the target stop position. After that, the second CPU proceeds to Step 995, and temporarily finishes this routine.

A specific description is now given of the deceleration-for-stop control. The second CPU transmits an acceleration for stop Gst (<0) set in advance to the drive ECU 40 and the brake ECU 50. The acceleration for stop Gst is a negative value, and is a deceleration. The drive ECU 40 controls, based on the received acceleration for stop Gst, the drive source actuator 42 so that the drive source 42a does not generate the driving force. The brake ECU 50 controls the brake actuator 52 so that the acceleration G of the vehicle VA matches the acceleration for stop Gst. Also in the deceleration-for-stop control, the second CPU transmits, to the steering ECU 60, the target steering angle for the vehicle VA to travel along the target path.

Meanwhile, when the second CPU proceeds to Step 920, and has not received the operation signal from the portable terminal 27, the second CPU makes a determination of "No" in Step 920, and proceeds to Step 940. In Step 940, the second CPU executes no-operation deceleration control of decelerating the vehicle VA at a no-operation acceleration Gnt (<0) set in advance. The no-operation acceleration Gnt is a negative value, and is a deceleration. After that, the second CPU proceeds to Step 995, and temporarily finishes this routine.

For example, the no-operation acceleration Gnt is set to a value smaller than the acceleration for stop Gst. The no-operation deceleration control is different from the deceleration-for-stop control in such a point that the no-operation acceleration Gnt is transmitted in place of the acceleration for stop Gst, and is the same as the deceleration-for-stop control in the other points, and a detailed description is thus not given.

<Arrival Determination Routine>

The second CPU executes an arrival determination routine of FIG. 10 illustrated as a flowchart each time a predetermined period elapses.

Thus, the second CPU starts processing from Step 1000 at a predetermined timing, proceeds to Step 1005, and determines whether or not the value of the start flag Xstart is "1." When the value of the start flag Xstart is "0," the second CPU makes a determination of "No" in Step 1005, proceeds to Step 1095, and temporarily finishes this routine.

Meanwhile, when the value of the start flag Xstart is "1" the second CPU makes a determination of "Yes" in Step 1005, proceeds to Step 1010, and determines whether or not the value of the deceleration flag Xdec is "0."

When the value of the deceleration flag Xdec is "0," the second CPU makes a determination of "Yes" in Step 1010, and executes processing in Step 1013 and Step 1015 in this order.

Step 1013: The second CPU acquires the vehicle speed Vs at the current time, calculates a deceleration distance required to stop the vehicle VA at the target stop position based on the vehicle speed Vs and the acceleration for stop Gst, and identifies, as the deceleration start position, the position before the target stop position by the deceleration distance along the target path. As described above, the vehicle speed Vs in the travel control is highly likely the target vehicle speed Vst. However, in a case in which operation invalid deceleration control is executed or the like, there is a fear in that the vehicle speed Vs does not match the target vehicle speed Vst. Thus, the second CPU acquires the vehicle speed Vs each time a predetermined period elapses, to thereby identify the deceleration start position.

Step 1015: The second CPU determines whether or not the vehicle VA has arrived at the deceleration start position.

The second CPU identifies the current position of the vehicle VA on the target path based on the vehicle speed Vs and the steering angle θs, and determines that the vehicle VA has arrived at the deceleration start position when the identified current position matches the deceleration start position.

When the vehicle VA has not arrived at the deceleration start position, the second CPU makes a determination of "No" in Step 1015, proceeds to Step 1095, and temporarily finishes this routine.

Meanwhile, when the vehicle VA has arrived at the deceleration start position, the second CPU makes a determination of "Yes" in Step 1015, proceeds to Step 1020, and sets the value of the deceleration flag Xdec to "1." After that, the second CPU proceeds to Step 1095, and temporarily finishes this routine.

When the second CPU proceeds to Step 1010, and the value of the deceleration flag Xdec is "1," the second CPU makes a determination of "No" in Step 1010, and proceeds to Step 1025. In Step 1025, the second CPU determines whether or not the vehicle VA has arrived at the target stop position. In more detail, when the current position of the vehicle VA on the target path identified based on the vehicle speed Vs and the steering angle θs matches the target stop position, the second CPU determines that the vehicle VA has arrived at the target stop position.

When the vehicle VA has not arrived at the target stop position, the second CPU makes a determination of "No" in Step 1025, proceeds to Step 1095, and temporarily finishes this routine.

When the vehicle VA has arrived at the target stop position, the second CPU makes a determination of "Yes" in Step 1025, and executes processing in Step 1030 to Step 1045 in this order.

Step 1030: The second CPU sets the value of the start flag Xstart to "0," and sets the value of the deceleration flag Xdec to "0."

Step 1035: The second CPU transmits the end signal to the portable terminal 27.

Step 1040: The second CPU does not cause the drive source 42a to transition to the non-actuation state, but continues to maintain the drive source 42a in the actuation state.

Step 1043: The second CPU actuates a parking brake actuator (not shown), to thereby change a shift position to a parking position.

When the parking brake actuator is actuated, a friction braking force is applied to the wheels, and the stop state of the vehicle VA is thus maintained.

Step 1045: The second CPU sets the value of the invalidity flag Xinv to "1."

After that, the second CPU proceeds to Step 1095, and temporarily finishes this routine.

<Drive Control Routine>

Figure 11:
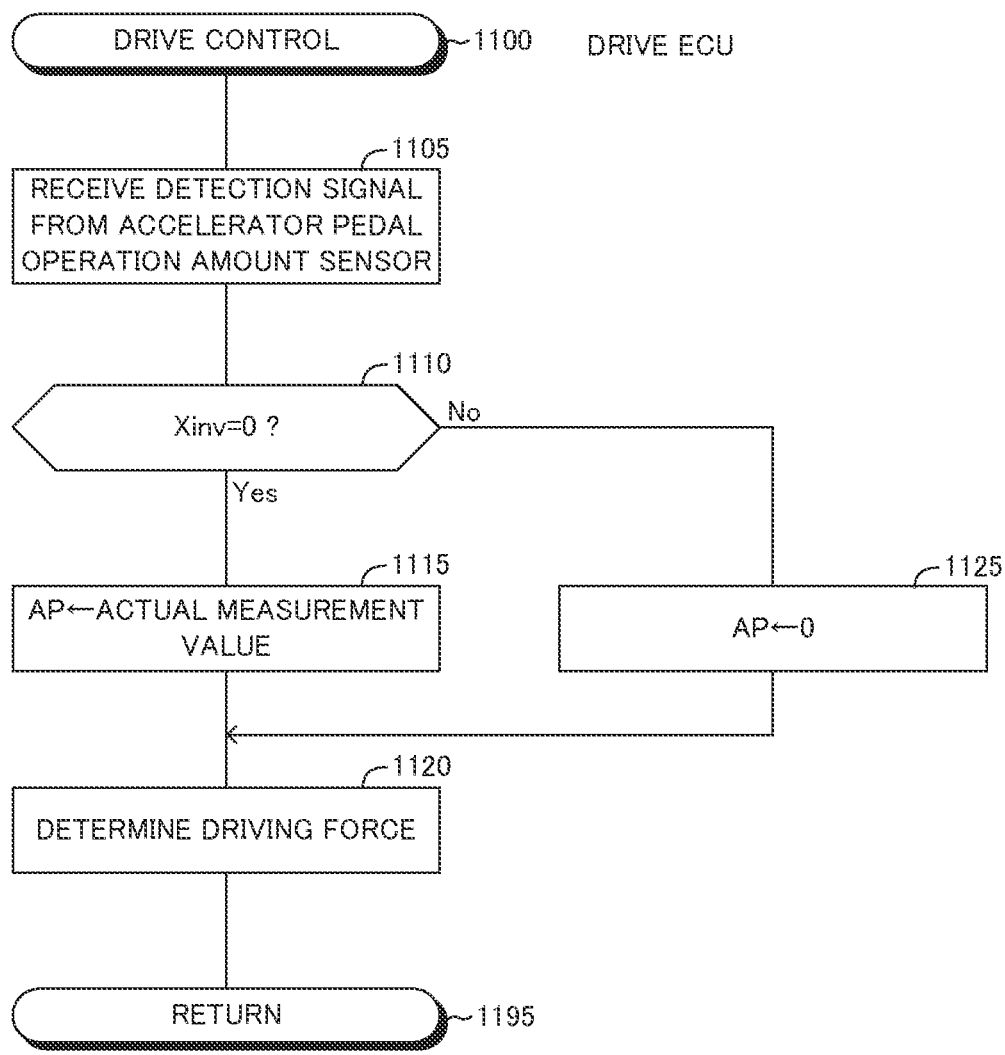
FIG. 11 is a flowchart for illustrating a drive control routine executed by a CPU of a drive ECU.

The CPU of the drive ECU 40 ("third CPU" hereinafter refers to the CPU of the drive ECU 40 unless otherwise specified) executes a drive control routine illustrated in a flowchart of FIG. 11 each time a predetermined period elapses.

Thus, the third CPU starts processing from Step 1100 at a predetermined timing, and executes processing in Step 1105 and Step 1110 in this order.

Step 1105: The third CPU acquires the detection signal from the accelerator pedal operation amount sensor 41.

Step 1110: The third CPU determines whether or not the value of the invalidity flag Xinv is "0." The parking ECU 30 notifies the drive ECU 40 of the value of the invalidity flag Xinv each time a predetermined period elapses.

When the value of the invalidity flag Xinv is "0," the third CPU makes a determination of "Yes" in Step 1110, and executes processing in Step 1115 and Step 1120 in this order.

Step 1115: The third CPU sets the accelerator pedal operation amount AP to the accelerator pedal operation amount AP (actual measurement value of the accelerator pedal operation amount sensor 41) indicated by the detection signal received in Step 1105.

Step 1120: The third CPU determines the driving force based on the accelerator pedal operation amount AP set in Step 1115 or Step 1125 described below, and controls the drive source actuator 42 so that the drive source 42a generates the driving force.

When the drive ECU 40 has received, from the parking ECU 30, an acceleration (hereinafter referred to as "control acceleration") of any one of the target acceleration Gt, the acceleration for stop Gst, and the no-operation acceleration Grit, the third CPU controls the drive source actuator 42 so that the drive source 42a generates a larger driving force of the driving force determined based on the accelerator pedal operation amount AP and the driving force determined based on the control acceleration.

After that, the third CPU proceeds to Step 1195, and temporarily finishes this routine.

Meanwhile, when the third CPU proceeds to Step 1110, and the value of the invalidity flag Xinv is "1," the third CPU makes a determination of "No" in Step 1110, proceeds to Step 1125.

In Step 1125, the third CPU sets the accelerator pedal operation amount AP to "0," proceeds to Step 1120, and determines the driving force. After that, the third CPU proceeds to Step 1195, and temporarily finishes this routine.

When the value of the invalidity flag Xinv is "1," the accelerator pedal operation amount AP is set to "0" regardless of the actual measurement value of the accelerator pedal operation amount sensor 41. In other words, when the value of the invalidity flag Xinv is "1," the accelerator pedal operation amount AP is set to "0" regardless of the operation on the accelerator pedal 41a. Thus, the drive source 42a does not generate the driving force.

As appreciated from the above description, with this control device 10, it is possible to eliminate the necessity of the startup operation when the legitimate user has gotten in the vehicle VA while reducing the liability of the theft of the vehicle VA.

The present disclosure is not limited to those embodiments and modified examples, and can adopt various modified examples within the scope of the present disclosure.

(First Modification Example)

The cancellation condition is only required to be a condition that there can be confirmed, without requiring an operation by a user holding the legitimate qualification, the state in which the user has gotten in the vehicle VA, and is not limited to the above-mentioned example. Description is now given of examples of the cancellation condition.

The matching ECU 20 receives, after the start operation for the remote operation control has been executed, from the portable terminal 27, position information indicating the current position of the portable terminal 27 on which the start operation has been executed. When the matching ECU determines, based on the position information, that the current position of the portable terminal 27 is inside the vehicle after the vehicle VA has arrived at the target stop position, the matching ECU may determine that the cancellation condition is satisfied.

Further, a driver's seat camera configured to capture the face of a person sits in the driver's seat, to thereby generate face image data is provided in the vehicle VA. The matching ECU 20 acquires the face image data generated by the driver's seat camera after the vehicle VA arrives at the target stop position, and compares the acquired face image data and face image data on the legitimate user stored in advance with each other. After that, when the matching ECU 20 determines that the user who sits in the driver's seat after the vehicle VA has arrived at the target stop position is the legitimate user based on both of the pieces of face image data, the matching ECU 20 may determine that the cancellation condition is satisfied.

(Second Modification Example)

The parking ECU 30 notifies the brake ECU 50 of the value of the invalidity flag Xinv each time the predetermined period elapses. When the value of the invalidity flag Xinv is "1," the brake ECU 50 may invalidate the operation on the brake pedal 51a, and the steering ECU 60 may invalidate the operation on the steering wheel 61a.

In more detail, when the value of the invalidity flag Xinv is "1," the brake ECU 50 sets the brake pedal operation amount BP to "0" regardless of the actual measurement value of the brake pedal operation amount sensor 51. Further, when the value of the invalidity flag Xinv is "1," the steering ECU 60 sets the steering torque Tr to "0" regardless of the actual measurement value of the steering torque sensor 52.

(Third Modification Example)

In Step 720 of FIG. 7, the second CPU may determine the target stop position such that the front-and-rear direction upon stopping matches a current front-and-rear direction. In this case, the second CPU determines, as the target path, such a path that the vehicle VA travels straight. The target stop position and the target path may be determined by the operator of the portable terminal 27.

What is claimed is:

1. A vehicle control device, comprising:
   a drive device configured to enable application of a driving force to a vehicle in an actuation state and disable application of the driving force to the vehicle in a non-actuation state;
   a control unit including a processor that executes a program stored in a memory, configured to:
   control the drive device in such a manner as to change the driving force based on an operation on an accelerator by a user when the drive device is in the actuation state,
   communicate with a portable terminal present outside the vehicle, and
   execute remote operation control of controlling the drive device in accordance with a wireless signal transmitted from the portable terminal present outside the vehicle based on an operation on the portable terminal by the user to apply the driving force to the vehicle, to thereby cause the vehicle to move to a predetermined target stop position determined in advance; and
   a Bluetooth device configured to enable communication with the portable terminal in an activated state and disable communication with the portable terminal in an inactivated state,
   wherein the control unit is configured to:
   maintain the drive device in the actuation state without changing the drive device to the non-actuation state after an arrival time being a time at which the vehicle arrives at the target stop position through the remote operation control;
   invalidate the operation on the accelerator such that the drive device disables application of the driving force to the vehicle even when the accelerator is operated in a period from the arrival time to a cancellation condition satisfaction time at which a cancellation condition by which a fact that a user holding legitimate qualification for using the accelerator to drive the vehicle has gotten in the vehicle can be confirmed without requiring an operation by the user is satisfied;
   when the Bluetooth device is in the inactivated state, change a state of the Bluetooth device to the activated state so that the Bluetooth device enables communication with the portable terminal, based upon a condition being met in which: (i) an electronic key transmits a key identifier set in advance, through a wireless signal, and is present outside the vehicle within a predetermined range of the vehicle, and (ii) the key identifier transmitted by the electronic key matches a vehicle identifier stored in advance;
   change the drive device to the actuation state when a predetermined startup operation is executed on the portable terminal present outside the vehicle, and the control unit receives a startup signal transmitted by the portable terminal via the Bluetooth device; and
   start the remote operation control when a predetermined start operation is executed after the predetermined startup operation is executed on the portable terminal present outside the vehicle, and the control unit receives a start signal transmitted by the portable terminal via the Bluetooth device.

2. The vehicle control device according to claim 1, wherein the control unit is configured to determine that the cancellation condition is satisfied when the electronic key transmits, through a wireless signal, the key identifier from inside the vehicle, and the key identifier transmitted by the electronic key matches the vehicle identifier.

* * * * *